United States Patent Office 3,786,005
Patented Jan. 15, 1974

3,786,005
CATALYZING URETHANE FOAM POLYMERIZATION WITH 4-(2 - DIMETHYLAMINOMETHYL) MORPHOLINE
Ibrahim S. Bechara, Boothwyn, and Rocco L. Mascioli, Media, Pa., assignors to Air Products and Chemicals, Inc., Wayne, Pa.
No Drawing. Continuation-in-part of application Ser. No. 109,641, Jan. 25, 1971. This application Aug. 22, 1972, Ser. No. 282,820
Int. Cl. C08g 22/44
U.S. Cl. 260—2.5 AC                           4 Claims

ABSTRACT OF THE DISCLOSURE

A precursor mixture comprising organic materials having a plurality of isocyanato groups per molecule and organic materials having a plurality of hydroxy groups per molecule, said precursor containing modifying agents such as surfactants, fillers, foaming agents, dyes and/or similar minor components, is transformed into a useful polyurethane foam structure by reliance upon 4-(2-dimethylaminoethyl)morpholine as the principal amine catalyst for the polymerization.

CROSS REFERENCE TO RELATED APPLICATION

This application is a continuation-in-part of Ser. No. 109,641, filed Jan. 25, 1971, now abandoned.

BACKGROUND OF THE INVENTION

Field of the invention

This invention relates to synthetic resins, and poreforming, and particularly to catalysis of the formation of cellular polyurethanes.

Prior art

Catalytically polymerized polyurethane has the advantage of being nearly exhaustively polymerized with a minimum residual concentration of unreacted hydroxy groups and/or unreacted isocyanato groups. A relatively few styles of mixing machines have permitted polyurethane technologists to produce an extreme variety of polyurethane foam products. The opportunity to plan for formulating a great variety of end products has been one of the factors strengthening the polyurethane industry.

Tertiary amines have been employed as polyurethane catalysts. In an effort to minimize the odor and in an effort to minimize the catalysis of degradation of the foam, polyurethane technologists have generally sought to minimize the concentration of a catalyst employed in a precursor.

Triethylenediamine is an example of a widely used polyurethane catalyst which has effectiveness in preparing polyurethane foams derived from polyethers, foams derived from polyesters, foams utilizing fluorocarbon blowing agents, foams utilizing water as a blowing agent, and in a variety of other categories of foams. When triethylenediamine (sometimes called TEDA) is employed as a co-catalyst with stannous octoate catalyst, the range of satisfactory proportions may be critically narrow, thus prompting use of other amine catalysts to achieve a convenient latitude in proportions.

Triethylenediamine is a relatively costly chemical, and some polyurethane has been produced using cheaper amine catalysts. N-ethyl morpholine is one of the most widely used polyurethane catalysts, and is cheap enough that it has provided one standard of comparison, even though N-ethyl morpholine (sometimes abbreviated as NEM) must be used in quantities significantly larger than the quantities of triethylenediamine which might be employed. In discussing amine catalysts, it should be recognized that salts of amines, and mixtures of acid and/or salt with amine, are embraced within the generic term of amine catalyst.

A considerable variety of amines other than NEM and TEDA have been proposed as polyurethane catalysts but relatively few have been able to achieve any prolonged period of widespread commercial usage as polyurethane catalysts.

Voluminous art has developed on the subject of catalysts useful in polyurethane formation. Enumeration of a long list of patents and articles in which polyurethane formation catalysis is considered would serve no useful purpose. However, notation of U.S. Pat. No. 3,476,933 to Mendelsohn is warranted in a showing of N-alkyl and N-aminoalkyl morpholines as catalysts for polyurethane formation. Also of interest is U.S. Pat. No. 2,949,431 to Britain in showing polyurethane formation catalysts with N-alkyl-, N-aminoalkyl-, and N-dialkylaminoalkyl piperazines.

A relatively small number of commercially utilized catalysts have accounted for most of the consumption of polyurethane catalysts during the past decade. The polyurethane industry has preferred to rely upon TEDA, NEM, and a few other catalysts because they meet the commercial conditions, which are very different from those prevailing in some of the laboratory experiments employed in screening proposals for catalysts. The formation of a monourethane by the reaction of a monohydroxy alcohol and an organic monoisocyanato can be catalyzed by a tertiary amine, and the reaction rates for monourethane formation in the presence of various tertiary amines has been utilized by scholars in studies of the catalytic effectiveness of various amines. There have been extremely great discrepancies between the comparative data pertinent to the overall performance of a series of candidates contemplated for use as polyurethane catalysts in typical industrial situations and the comparative data concerning such candidates as catalysts for reaction rates of monofunctional compounds. Accordingly, data pertinent to the use of tertiary amines as catalysts for a monofunctional urethane reactions have long been considered as primarily of interest to scholarly theorists, and substantially irrelevant to industrial technologists concerned with catalyst for industrial production of polyurethane.

Formulators of polyurethane who have prepared products at industrial conditions using each of several catalysts or catalyst combinations have developed a judgment relating to preference of catalyst for particular types of operations, which judgment is based not purely upon the relative costs of the catalyst, but is influenced in part by such factors as reliability of the method, aging characteristics of the polyurethane foam, residual odor in the polyurethane foam, and related factors.

The versatility of the usefulness of NEM as a polyurethane catalyst has been curtailed in part by the necessity for using such large amounts of NEM. There has been a longstanding unsatisfied demand for a polyurethane catalyst having some of the versatility of NEM but sufficiently more active to permit usage of the catalyst in amounts which were a fraction of the requirements for NEM.

SUMMARY OF THE INVENTION

In accordance with the present invention, a precursor for a polyurethane foam is polymerized by the use of 4-(2-dimethylaminoethyl)morpholine as the principal amine catalyst. It is usually desirable to employ 4-(2-dimethylaminoethyl)morpholine (sometimes called DMAEM) as the only amine catalyst in the precursor but minor amounts of other amine catalysts may sometimes be appropriate. Other catalysts, such as stannous octoate may be utilized with DMAEM. Surfactants, blowing agents, and/or other modifiers are utilized in accordance with the contemplated method or end use for the product. The 4-(2-dimethylaminoethyl) morpholine is an effective catalyst for all varieties of polyurethane foam.

A typical formulation for the production of polyurethane resins or foams includes:

(1) compounds which contain active hydrogen atoms
(2) polyisocyanates
(3) additives such as blowing agents, emulsifiers, surfactants, fire retardants, fillers, pigments and others.

Compounds which contain active hydrogen atoms are those polyols having at least two active hydrogens. The term active hydrogen atoms refers to hydrogen atoms which, because of their position in the molecules, display activity according to the Zerewitinoff test as described by Kohler in J. of Am. Che. Soc. 49, 3181 (1927).

Polyisocyanates which may be used as precursor material according to the invention are those known aliphatic, cycloaliphatic, araliphatic, and aromatic polyisocyanates and their thio analogs. Examples of these are the 2,4- and 2,6-toluene diisocyanates and mixture of the two isomers; bis(4-isocyanato phenyl)methane and higher molecular weight products produced by the phosgenation of aniline/formaldehyde condensation products; bis-(2-isocyanato fumarate); 1,5-naphthalene diisocyanate; xylylene diisocyanates; benzyl diisocyanate; triphenyl methane-4,4′,4″ triisocyanate; xylylene-alpha-alpha-diisothiocyanate; and the like.

Further included are dimers and trimers of diisocyanates and polyisocyanates and compounds of the general formula $M(NCO)_x$ where $x$ is one or more and M is a monofunctional or polyfunctional atom or group. Examples of this type of compound include ethyl phosphoric diisocyanate, $C_2H_5P(NCO)_2$; phenyl phosphorous diisocyanate; and diisocyanates derived from disulfonamide $M(SO_2NCO)_2$.

Also a suitable starting material for the production of polyurethanes in the process according to the invention are the so-called prepolymers which are the reaction products of the polyols with excess polyisocyanates. Also to be included are the polymerized isocyanates containing isocyanurate rings.

Furthermore, the compounds according to the invention have a catalytic effect both with polyether polyols in which the terminal secondary hydroxyl groups have been converted into primary hydroxy groups by the addition of ethylene oxide and with polyether polyols in which the modification with ethylene oxide has been achieved in any desired manner by block polymerization or copolymerization within the chain. The same applies to polyethers modified with alkylene oxide within the chain or at the end of the chain.

Illustrative hydroxy-terminated polyesters are those which are prepared by polymerizing a lactone (preferably, an epsiloncaprolactone) in the presence of an active hydrogen-containing starter as disclosed in U.S. Pats. Nos. 2,914,556; 2,890,208; 2,878,236; and 2,997,385. Polyesters from adipic acid and diols such as ethylene glycol, propylene glycol, diethylene glycol, and the like, and triols such as 1,1,1-trimethylolpropane, glycerol, and others, are also useful. Copolymers of lactones and alkylene oxides such as those described in U.S. Pat. No. 2,962,524, can also be used with good results.

Illustrative polyhydroxyalkane include, among others, ethylene glycol, propylene glycol, 1,3-dihydroxybutane, glycerol, 1,2,6-trihydroxyhexane, 1,1,1-trimethylolpropane, pentaerythritol, sorbitol, and the like. The alkylene oxide adducts of the above-exemplified polyhydroxyalkanes can also be employed, preferably the ethylene oxide, propylene oxide, the epoxybutane, the epichlorohydrin, or mixtures thereof, adducts of said polyhydroxyalkanes.

Another useful class of polyols which can be employed are the trialkanolamines and the alkylene oxide adducts thereof. Illustrative trialkanolamines include triethanolamine and triisopropanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides which have 2 to 4 carbon atoms, for example, ethylene oxide, 1,2 - epoxypropane, the epoxybutanes, and mixtures thereof. Mono- and polyamines suitable for reaction with alkylene oxides include, among others, ethylamine, benzylamine, aniline, ethylenediamine, diethylenetriamine, 1,3 - butanediamine, phenylenediamines, toluenediamine, and the like. Others which deserve particular mention are the alkylene oxide adducts of aniline or substituted-aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the nonreducing sugars and sugar derivatives contemplated are sucrose, alkyl glycosides such as methyl glucoside, and the like, polyol glycosides such as ethylene glycol glucoside, propylene glycol glucoside, and the like.

Another desirable class of polyols are the alkylene oxide adducts, preferably with ethylene oxide, such as 1,2-epoxypropane, epoxybutane, and mixtures thereof; or adducts of aromatic amine/phenol/aldehyde ternary condensation products. The propylene oxide and mixed propylene-ethylene oxide adducts of aniline/phenol/formaldehyde ternary condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, the polyphosphoric acids such as tripolyphosphoric acid, and the like are desirable for use in this connection. Also useful are phosphites such as tris(dipropylene glycol) phosphite and the phosphonates which can be produced therefrom by heating in the presence of, e.g., butyl bromide, as well as the alkylene oxide adducts thereof.

The polyol or polyol mixture employed can have hydroxyl numbers which vary over a wide range. In general, the hydroxyl numbers of the polyols employed in the invention can range from about 20, and lower, to about 1000, and higher. The hydroxyl number is defined as the number of milligrams of potassium hydroxide required for the complete neutralization of the hydrolysis product of the fully acetylated derivative prepared from 1 gram of polyol. The hydroxy number can also be defined by the equation:

$$OH = \frac{56.1 \times 1000 \times f}{M.W.}$$

where:
OH=hydroxyl number of the polyol
$f$=average functionality, that is, average number of hydroxyl groups per molecule of polyol
M.W.=average molecular weight of the polyol The exact polyol employed depends upon the end-use of the polyurethane product of the process of the invention. For example, when used to prepare foams, the functionality and the hydroxyl number are selected properly to result in flexible, semi-flexible or rigid foams. The above polyols preferably possess a hydroxyl number of from about 200 to about 800 when employed in rigid foam formulations, from about 40 to about 250 for semi-flexible foams, and from about 20 to about 70 or more when employed in flexible foam formulations. Such limits are not intended to be restrictive, but are merely illustrative of the large number of possible combinations of the above polyol coreactants.

Suitable blowing agents are compounds that liberate gases such as nitrogen, e.g., azo compounds or sulphonyl azides; compounds that liberate $CO_2$, e.g.,

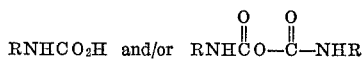

formed in situ from the reaction of water and polyisocyanates; low boiling hydrocarbons such as ethane, propane, hexane or heptane and their halogenation products, e.g., halogenated methanes or ethanes, chlorofluoromethanes, ethylene dichloride and vinylidene chloride.

The usual emulsifiers, and foam stabilizers and crosslinkers may be used as additives to facilitate the mixing and foaming reactions. These additives include higher alkyl or aryl sulfonic acids and their salts. Sulfuric acid esters of castor oil or of ricinoleic acid and their salts; oleic acid salts or stearic acid salts; silicone oils which contain basic groups; and mixed condensation products which contain siloxane and alkylene oxide groups. Also, dyes, fillers and plasticizers may be included.

DESCRIPTION OF PREFERRED EMBODIMENTS

The invention is further clarified by reference to a plurality of examples.

Example 1

A precursor was prepared in a mixing machine of the standard type widely employed for production of polyurethane foam. The precursor contained 100 parts of a standard polyester resin of the propylene glycol adipate type having a molecular weight of about 2000 and a hydroxyl number of about 53 and an acid number of less than 2, such a polyester resin identified as Fomrez 50. The precursor contained 3.6 parts of water and 1 part of a block polymer silicone surfactant such as marketed as Silirone L-532. The precursor included 45.4 parts of tolylene diisocyanate. In a series of tests the effects of various concentrations of 4-(2-dimethylaminoethyl)morpholine in the standard precursor were evaluated. In each case, the foam quality was excellent. The data relating to the cream time in seconds, to the rise time in seconds, and to the tub density in pounds per cubic foot establish that the 4-(2-dimethylaminoethyl)morfholine is an outstandingly advantageous catalyst. Data relating to the performance characteristics are set forth in Table A.

TABLE A

| Run | DMAEM concentration PHP | Activity, time in seconds | | Density PC |
|---|---|---|---|---|
| | | Cream | Rise | |
| a | 0.3 | 37 | 168 | 2.34 |
| b | 0.4 | 29 | 127 | 2.01 |
| c | 0.5 | 28 | 112 | 2.00 |
| d | 0.6 | 28 | 113 | 2.26 |
| e | 0.7 | 20 | 79 | 1.83 |
| f | 0.8 | 14 | 76 | 1.83 |
| g | 1.0 | 12 | 58 | 1.72 |

As a control, the same precursor composition was processed using various concentrations of N-ethyl morpholine as the catalyst, as shown in Table B.

TABLE B

| Run | NEM Concentration PHP | Activity, time in seconds | | Density PC |
|---|---|---|---|---|
| | | Cream | Rise | |
| a | 1.5 | 20 | 95 | 2.00 |
| b | 1.8 | 20 | 88 | 1.94 |
| c | 2.0 | 16 | 77 | 1.89 |
| d | 2.5 | 14 | 73 | 1.89 |
| e | 3.0 | 12 | 63 | 1.86 |

A comparison of the control catalyst NEM and the catalyst of the present invention 4-(2-dimethylaminoethyl)morpholine (DMAEM) indicate that the 4-(2-dimethylaminoethyl) morpholine is about three or four times as effective as a polyurethane catalyst as is the standard N-ethyl morpholine catalyst for polyurethane reactions.

Example 2

A catalyst blend comprising a polyalkyleneether polyol solvent and triethylene diamine (TEDA) was prepared. Precursor compositions containing 100 parts polyether polyol (CP-3000, a triol of average molecular weight of 3000 commercially available from Dow Chemical Company) 1 part L-520 silicone surfactant, 3.6 parts of water, 45.5 parts of 105 Index tolylene diisocyanate, 0.25 part of T-9 stannous octoate catalyst, and amine catalyst in the amounts shown below were evaluated to determine the differences between using said blend and DMAEM as the amine catalyst. The results are summarized in Tables C and D, and show that DMAEM is quite effective and shows favorable characteristics when compared with the commercially available blend-type catalyst composition.

TABLE C

| DMAEM catalyst concentration, parts/100 polyol | Activity, time in seconds | | Density PCF |
|---|---|---|---|
| | Cream | Rise | |
| 0.10 | 10 | 118 | 1.78 |
| 0.15 | 10 | 105 | 1.88 |

TABLE D

| Blend catalyst concentration, parts/100 polyol | Activity, time in seconds | | Density PCF |
|---|---|---|---|
| | Cream | Rise | |
| 0.3 | 12 | 92 | 1.84 |
| 0.45 | 10 | 83 | (¹) |

¹ Severe shrinkage.

Such data show that DMAEM has advantages as a catalyst in the production of polyether foams.

Example 3

A series of flexible polyester foam samples were prepared from precursor compositions which differed only as regards choice of and concentration of catalyst.

Common ingredients: Parts
  Polyester polyol (Fomrez 50) _____ 100.00
  Silicone surfactant (L-532) _____ 1.00
  Tolylene diisocyanate (TDI) _____ 45.4

Such proportions provided a TDI index of 105. As shown in Table E, satisfactory performance was achieved throughout a manageable range of concentrations of 4-(2-dimethylaminoethyl)morpholine.

TABLE E

| Run | A | B | C | D | E |
|---|---|---|---|---|---|
| Water p.p.h. | 3.57 | 3.56 | 3.55 | 3.53 | 3.52 |
| DMAEM p.p.h. | 0.28 | 0.445 | 0.56 | 0.67 | 0.78 |
| Cream, sec. | 27 | 23 | 20 | 17 | 12 |
| Rise, sec. | 94 | 108 | 84 | 75 | 66 |
| #/ft.³ tub density | 2.17 | 1.96 | 1.86 | 1.81 | 1.75 |

In a parallel control test the catalyst was a commercially used mixture of 1.6 parts of NEM and 0.3 part of dimethylcetylamine, as shown in Table F.

TABLE F

Run: A
  Water p.p.h. _____ 3.6
  Catalyst mixture, p.p.h. _____ 1.9
  Cream-sec. _____ 12
  Rise-sec. _____ 75
  #/ft.³ tub density _____ 1.95

This data also shows that DMAEM has advantages as a catalyst for preparing polyester foams.

Example 4

4-(2 - dimethylaminoethyl)morpholine (DMAEM) is employed in lieu of N-ethyl morpholine (NEM) in polyurethane foam formulations for use in machines for production of a significant variety of polyurethane foams and it is established that superior products and a series of processing advantages are attainable by the use of DMAEM, which must be used in concentrations from about 25 to about 35% of the concentrations of NEM used commercially. Variations of catalyst compositions, such as presence or absence of stannous octoate, create no troublesome problems or critically narrow proportions for acceptable performance. The variations inherent in metering apparatus create no problems in using DMAEM in machines for mixing precursors for polyurethane foam. Choices of blowing agents such as fluorocarbons, compressed air, and water do not jeopardize the applicability of DMAEM for polyurethane catalysis. A wide variety of polyols and a wide variety of isocyanato-containing materials are suitable in formulations relying upon DMAEM as the principal amine catalyst. Use of surfactants, acid salts, pigments, dyes, and other modifying agents can follow commercial practices when DMAEM is employed as the principal amine catalyst. The viscosity, volatility, and related properties enhance the catalytic advantages of DMAEM as a polyurethane catalyst. Significant advantages in minimizing residual odor are achieved by the use of DMAEM. Because the wide applicability of DMAEM is one of the important advantages of DMAEM over dozens of previously proposed catalysts, it is intended that the claims embrace several varieties of novel methods featuring such use of DMAEM as catalyst.

Example 5

The preceding examples demonstrate the versatility and high quality of DMAEM in the catalysis of polyurethanes. A further and surprising area of advantage in the use of DMAEM resides in its physiological, ecological and practical use characteristics quite unpredictable from previously available information. DMAEM is a low vapor pressure liquid and being liquid avoids the various manipulative problems encountered in adopting solid catalyst materials to use in liquid precursor systems for polyurethane production. Its low vapor pressure shows to marked advantage in minimizing problems associated with liquid compositions of greater volatility, such as problems in plant control of objectionable fumes and plant personnel protection. An important further advantage resides in the finding that DMAEM, both in itself and in actual use, has a low level of toxicity. The combination of low toxicity and low vapor pressure is a factor about on a par with the highly effective catalytic activity of DMAEM.

A series of tests was made to compare the relative volatility of several catalyst materials. The vapor pressure of each was measured in millimeters of mercury (mm. Hg) at the indicated temperatures.

TABLE G

| Catalyst | Vapor pressure (mm. Hg) at— | |
|---|---|---|
| | 20° C. | 71° C. |
| NEM 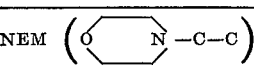 | 5 | 79 |
| DMAEM 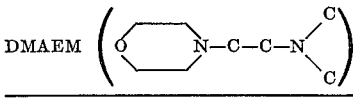 | 2.5-3 | 46 |

In the matter of toxicity, studies have been made. With the dimethylaminoethyl morpholine as with N-ethyl morpholine and trimethylaminoethyl piperazines and other nitrogeneous bases, the native corrosivity demands the exercise of normal care and caution in avoidance of direct contact of such chemicals with the eyes. However, the matter of vapor pressure of such chemicals assumes a position of considerable importance in relation to physiological aspects with plant operating personnel. It is well known in the industry that exposure under frequently encountered conditions to the fumes of such nitrogeneous chemicals can produce a condition known as cornea opaque, or more popularly as blue haze syndrome. The possibility of reducing the undesirable physiological aspects of the catalyst through lower vapor pressure is thus of considerable importance. In the exposure of rats and quail to 7 hours at 25° C. in an atmosphere nearly saturated with the vapors of the several chemicals, N-ethyl morpholine (NEM) was found to pose a definite hazard, trimethylaminoethyl piperazine (TAP) was only moderately hazardous and dimethylaminoethyl morpholine (DMAEM) was non-toxic.

As to dermal irritation characteristics, the toxicological studies showed that in the customary 24 hour contact with rabbit tongue tissue both N-ethyl morpholine and trimethylaminoethyl piperazine exhibited tolerance levels, $LD_{50}$, of 0.51 ml./kg. while the dimethylaminoethyl morpholine was surprisingly less toxic in showing an $LD_{50}$ in the order of 2.00 ml./kg.

In acute oral toxicity studies with young male albino rats, $LD_{50}$ values were TAP _____ ml./kg__ 0.77
NEM _____ g./kg__ 1.78
DMAEM _____ g./kg__ 3.0

These differences are of considerable importance in the industry and establish DMAEM as a favored material even when the catalytic properties of such as TAP may approach similar activity levels as DMAEM in some of the polyurethane systems.

Thus, the use of 4-(2-dimethylaminoethyl)morpholine in previously untried and unsuggested catalysis of polyurethane formulations coupled with its further characteristics of low vapor pressure and low toxicity level present a marked technological improvement in an area in which such qualities are much sought and, if found as herein, highly advantageous to the industry.

Example 6

A series of tests run at plant-type production levels was made with several catalyst compositions as the variant. The amount of materials employed was adequate for runs in a standard machine at typical operating conditions. The precursor formulation was:

| | Parts by weight |
|---|---|
| Polyester polyol (HR 5000) | 100 |
| Cross-linker (Chloroaniline type LD 813) | 5 |
| Pumpability lubricant (High MW ethyleneglycol E-6000) | 0.024 |
| Surfactant (Methyl Siloxane Fl-1630) | 0.035 |
| Tolylene diisocyanate (6535/8020 blend) | 33 |
| Water | 2.4 |

Catalyst—composition and amount as shown.—The processing conditions were as follows:

Machine _____ Martin Sweets.
Throughput _____ 25 lbs./minute.
Premix temperature _____ 75±2° F.
Isocyanate temperature ____ 75±2° F.
Catalyst blend temperature _ Ambient.
Mold dimensions _____ 16" x 16" x 4" aluminum.
Mold temperature _____ 130° F.
Post cure _____ None.

The catalyst compositions were prepared, severally, by mixing the water portion of the formulation as applicable to each test to provide the blends as follows in parts by weight:

| Catalyst blend | R | S | T |
|---|---|---|---|
| TEDA in polyalkyleneether polyol solution (1/2) | 0.20 | 0.20 | 0.20 |
| NIAX A-1* | 0.18 | 0.18 | |
| NEM | 1.00 | | |
| DMAEM | | 0.32 | 0.50 |
| (Water) | (2.4) | (2.4) | (2.4) |

*An amine catalyst in liquid form of 70% 2,2'-oxybis(N,N-dimethylethylamine) dissolved in 30% dipropylene glycol.

The results of the machine runs follow:

| Runs using catalyst blends | R | S | T |
|---|---|---|---|
| Reactivities: | | | |
| Cream time (secs.) | 6 | 6 | 6 |
| Rise time (secs.) | 94 | 95 | 94 |
| Hard gel (secs.) | 116 | 109 | 114 |
| De-mold time (mins.) | 10 | 10 | 10 |
| Foam properties: | | | |
| Density, PCF: | | | |
| Free rise | 2.56 | 2.51 | 2.59 |
| Molded | 2.70 | 2.70 | 2.80 |
| Tear lbs./in | 2.75 | 2.72 | 2.83 |
| Tensile, p.s.i. | 25.2 | 24.2 | 22.5 |
| Elongation, percent | 260 | 255 | 265 |
| Comp. set, 75% deflection | 6.4 | 6.6 | 6.5 |
| Comp. set (50%) after humid aging | 25.3 | 26.7 | 25.0 |
| ILD: | | | |
| 25% | 32.2 | 33.0 | 33.0 |
| 65% | 86.0 | 87.0 | 99.0 |
| 25% return | 25.0 | 26.2 | 27.3 |
| Sag factor | 2.60 | 2.64 | 3.0 |
| Resilience, ball rebound percent | 51.5 | 55.5 | 57.3 |
| Air flow CFM | 3.04 | 3.37 | 3.22 |
| Cells/inch | 36 | 40 | 36 |

Example 7

By a series of tests similar to those in Example 2, it is shown that polyether polyurethanes can be prepared from precursors comprising stannous octoate and a mixture of amine catalysts comprising DMAEM. Particularly favorable results are achieved by the use of DMAEM as the principal amine catalyst, that is, more than 50% by weight of the mixture of amines. Among the satisfactory amines for minor usage in such mixtures are N,N'dimethyl piperazine, tetramethyl tetramethylenediamine, N-ethyl morpholine, triethylenediamine, quinuclidine, and dimethyl cyclohexylamine. The flexibility of usage of DMAEM, whereby it can be employed as a highly active polyurethane catalyst in a manner permitting a formulator to accurately predict its performance, has proven to be one of its significant advantages over competitive catalysts.

Obviously, many modifications and variations of the invention as hereinbefore set forth may be made without departing from the spirit and scope thereof, and therefore only such limitations should be imposed as are indicated in the appended claims.

What is claimed is:

1. In the method in which an organic material containing a plurality of isocyanato groups per molecule is catalytically reacted in the presence of modifying agents including a blowing agent with an organic material containing a plurality of hydroxyl groups per molecule to produce a polyurethane foam, the improvement which consists of catalyzing the reaction by utilizing as the catalyst a composition in which at least a major portion of the catalytically active portion of the composition comprises tertiary amine of which at least a major portion is the compound 4-(2-dimethylaminoethyl)morpholine present in an amount of from about 0.1 to about 1.0 part per 100 parts of organic material containing a plurality of hydroxyl groups per molecule.

2. The method of claim 1 in which tolylene diisocyanate is the organic material containing a plurality of isocyanato groups per molecule, in which the organic material containing a plurality of hydroxyl groups per molecule is selected from the group consisting of polyester polyols and polyether polyols, and in which the tertiary amine of the catalyst is comprised of a minor portion of at least one tertiary amine selected from the group consisting of N,N'-dimethyl piperazine, tetramethyl tetramethylene-diamine, N-ethyl morpholine, triethylenediamine, quinuclidine, dimethylcyclohexylamine.

3. The method of claim 1 in which the catalyst is a liquid having a vapor pressure at 20° C. no higher than 3 mm. Hg, and an acute oral toxicity, $LD_{50}$, of at least 3.0 g./kg.

4. The method of claim 1 in which the catalyst is at least twice as effective in catalyzing the formation of polyurethane foam as an equivalent concentration in parts per 100 parts of polyol in the formulation of N-ethyl morpholine.

References Cited
UNITED STATES PATENTS

| 3,476,933 | 11/1969 | Mendelsohn | 260—2.5 |
| 2,949,431 | 8/1960 | Britain | 260—2.5 |
| 3,397,158 | 8/1968 | Britain et al. | 260—2.5 |
| 3,210,349 | 10/1965 | Godfrey | 260—247.5 |

DONALD E. CZAJA, Primary Examiner

E. C. RZUCIDLO, Assistant Examiner

U.S. Cl. X.R.

260—2.5 AP, 75 NC, 77.5 AC